B. S. SUMMERS.
MECHANISM FOR TREATING THE STRAW OF FLAX AND THE LIKE.
APPLICATION FILED MAR. 24, 1906.

1,082,778.

Patented Dec. 30, 1913.

Witnesses
Robt. Klotz
J. C. Goosmann

Inventor
Bertram S. Summers
By Rector, Hibben & Davis
His Attys

B. S. SUMMERS.
MECHANISM FOR TREATING THE STRAW OF FLAX AND THE LIKE.
APPLICATION FILED MAR. 24, 1906.

1,082,778.

Patented Dec. 30, 1913.

Witnesses
Robt. Klotz
J. C. Goosmann

Inventor
Bertrand S. Summers
By Rector, Hibben & Davis
His Attys.

UNITED STATES PATENT OFFICE.

BERTRAND S. SUMMERS, OF PORT HURON, MICHIGAN, ASSIGNOR, BY MESNE ASSIGNMENTS, TO SUMMERS LINEN COMPANY, OF PORT HURON, MICHIGAN, A CORPORATION OF MAINE.

MECHANISM FOR TREATING THE STRAW OF FLAX AND THE LIKE.

1,082,778.  Specification of Letters Patent.  Patented Dec. 30, 1913.

Application filed March 24, 1906. Serial No. 307,913.

*To all whom it may concern:*

Be it known that I, BERTRAND S. SUMMERS, a citizen of the United States, residing at Port Huron, in the county of St. Clair and State of Michigan, have invented certain new and useful Mechanism for Treating the Straw of Flax and the like, of which the following is a specification.

The object of the invention is to provide mechanism for breaking the straw of flax, hemp or the like and scutching and cleaning the fiber in a continuous process.

To this end the invention in its complete embodiment as herein shown consists in a means for conveying the straw, laid transversely to the direction of motion, continuously through the machine, a means for breaking the wood, or pith, from end to end of the straw, a means for scutching or beating the straw to free the fiber from pith and a means for subjecting the opposite ends of the straw successively to the action of the beaters.

The means for breaking the wood of the stalk throughout its length without breaking the fiber (while the stalk is fed through the machine transversely to the direction of motion) constitutes an important feature of my invention. It consists, in the present instance, in a device for forming a series of sharp bends or crimps in the stalk progressively from one point to another (preferably from the middle toward both ends) whereby slack is provided to form each crimp by the free longitudinal motion of the portion of the stalk not yet acted upon by the device.

Another feature of the invention consists in a conveying device for grasping the broken straw near the middle and conveying it successively through and past the beaters adapted to act upon the opposite ends.

A further feature of the invention consists in means for relaxing the grasp of the conveying device upon the straw and imparting a slight longitudinal motion to the straw during its passage from one beater to the other, for the purpose of exposing to the action of the second beater the portion of the straw guarded from the first beater by the chain.

Figure 1:
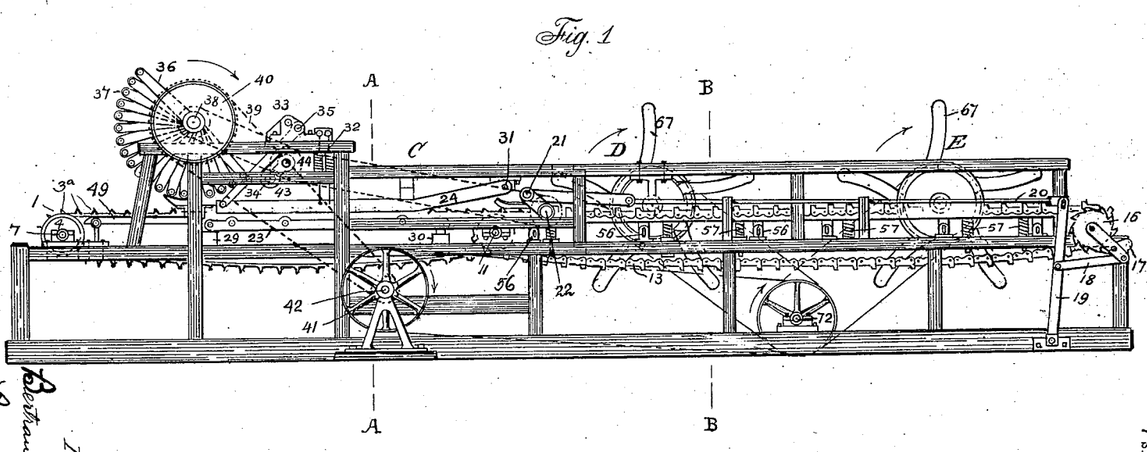
Figure 1 is a side elevation of the complete machine.
Figure 2:
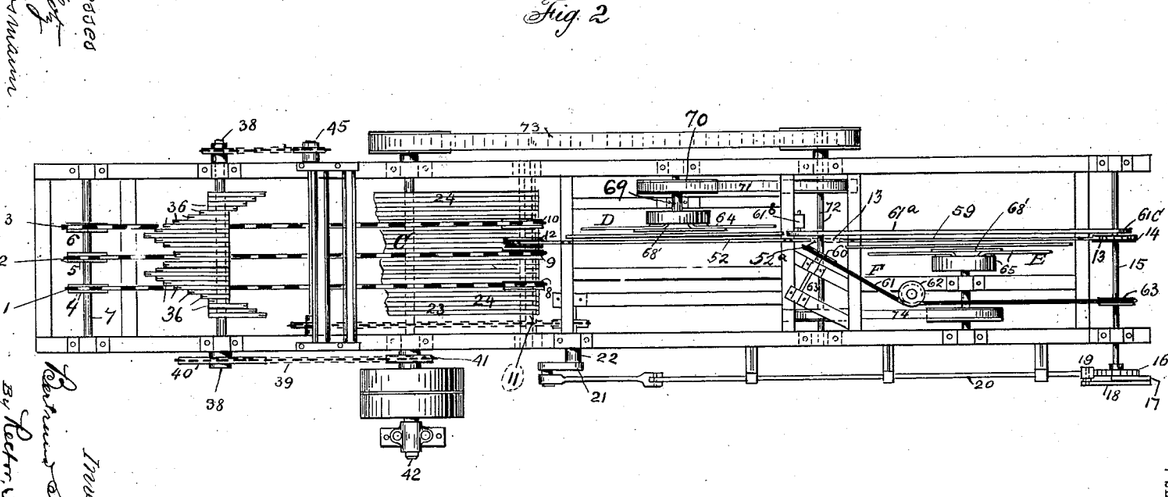
Fig. 2 a plan of the same.

In the general side elevation and plan I have indicated the location of the breaking device for the straw at C; of the first beater at D; of the second beater at E; and of the device for imparting longitudinal motion to the partially beaten straw at F.

Figure 10:
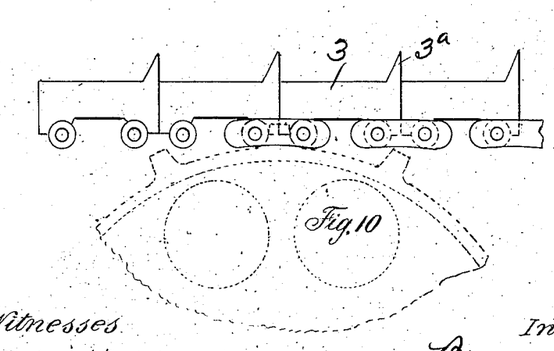
Fig. 10 is a side elevation of a part of the conveying chain for carrying the straw, showing its engagements with the driving sprocket wheel.
Figure 11:
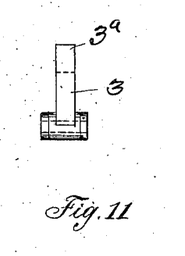
Fig. 11 an end elevation of the chain.
Figure 12:
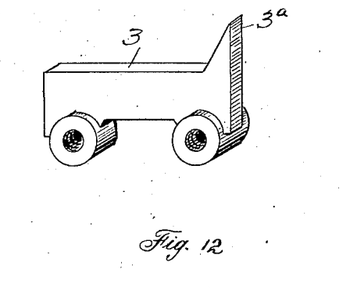
Fig. 12 a perspective view of a link thereof.

Referring to the present and preferred embodiment of my invention, a moving bed or conveyer, whereon the straw is to be laid crosswise (unthreshed or with the seed on) is formed at the left hand end of the machine by the conveyer belts or chains which are herein shown as three in number and marked 1, 2 and 3, Fig. 2. These belts pass around sprocket wheels 4, 5 and 6, respectively, which are carried on a shaft 7, journaled in the frame of the machine at the left hand end, and around corresponding sprocket wheels 8, 9 and 10, carried on shaft 11, near the middle of the frame. The shaft 11 carries also a sprocket wheel 12 fixed to it, on which travels another conveyer belt or chain 13, which extends longitudinally of the machine and passes around a sprocket wheel 14 carried on shaft 15, journaled in the frame at the extreme right hand end of the machine. These parts are shown in general in Figs. 1 and 2 and in detail in Figs. 10, 11 and 12. This shaft 15 is driven with an intermittent motion by means of a ratchet wheel 16 and pawl 17, operated through links 18, lever 19, rod 20 and crank 21, connected with a continuously rotating shaft 22, Fig. 1. Thus in the present instance, the intermittent motion from left to right is imparted to the upper reaches of the conveyer chains 1, 2 and 3, passing through the breaking apparatus and to the conveyer chain 13, which carries the broken flax through the beaters.

Figure 3:
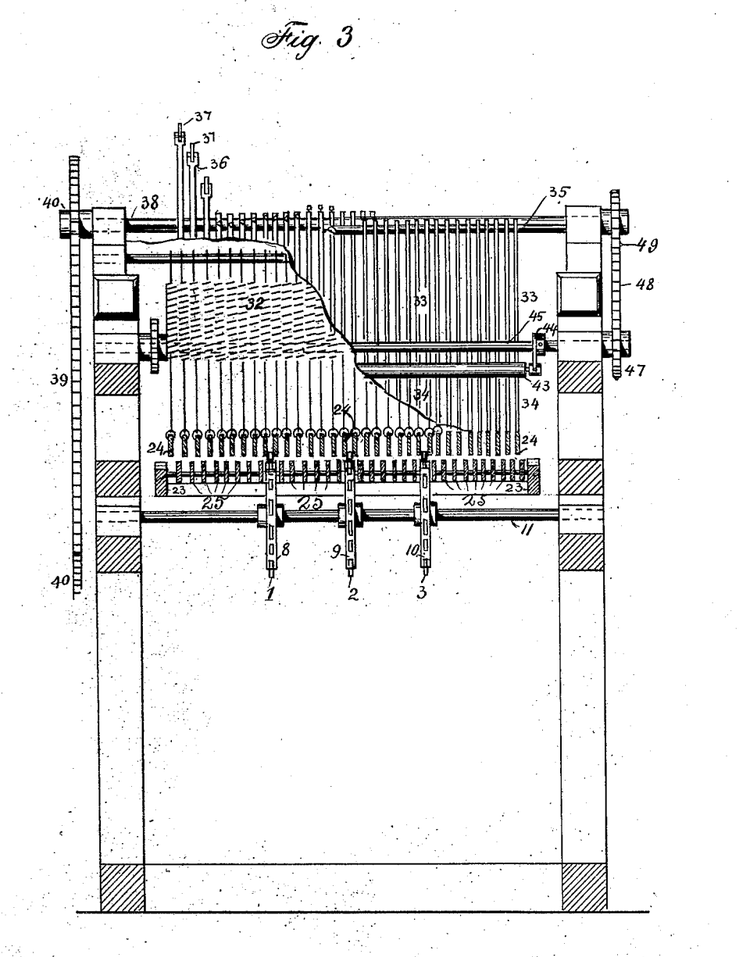
Fig. 3 a vertical cross-section on the line A A—Fig. 1.
Figures 4, 16, 17:
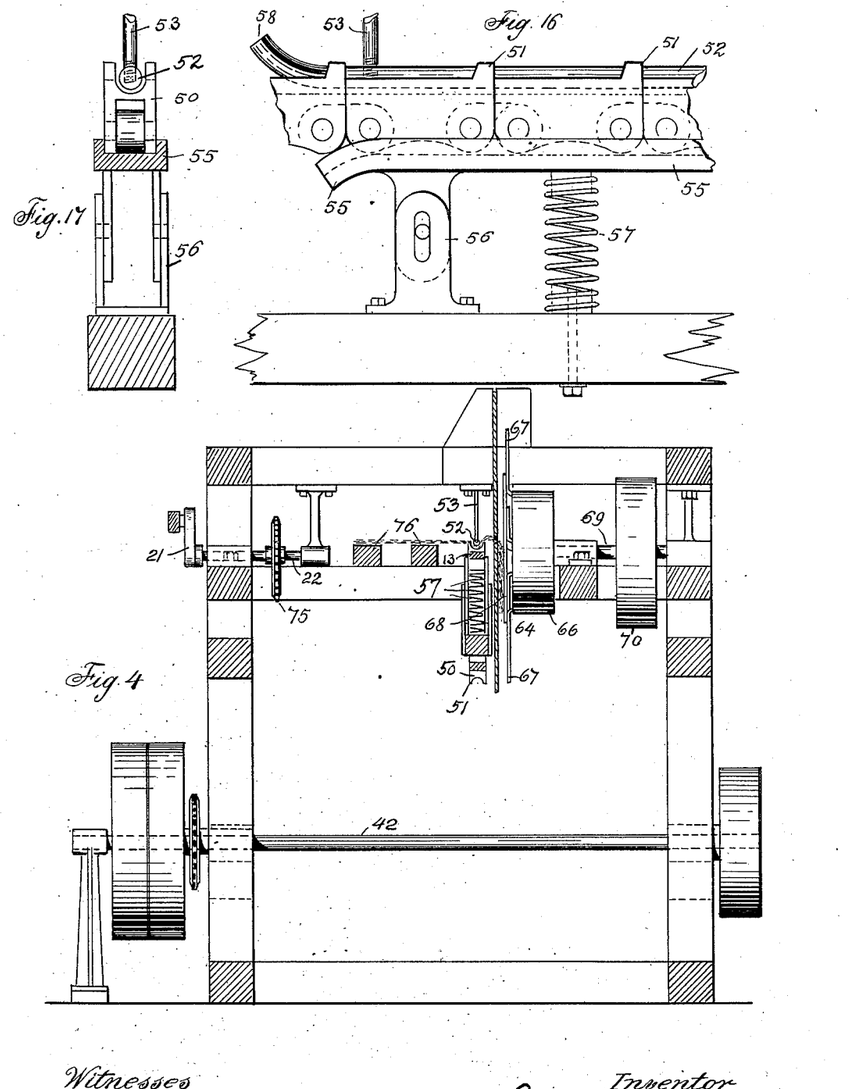
Fig. 4 a vertical cross-section on the line B B—Fig. 1.
Fig. 16 a side elevation of the conveying chain, together with the rod with which it operates to grasp the flax, and the track whereon the chain travels.
Fig. 17 a vertical cross-section of the same.
Figure 5:
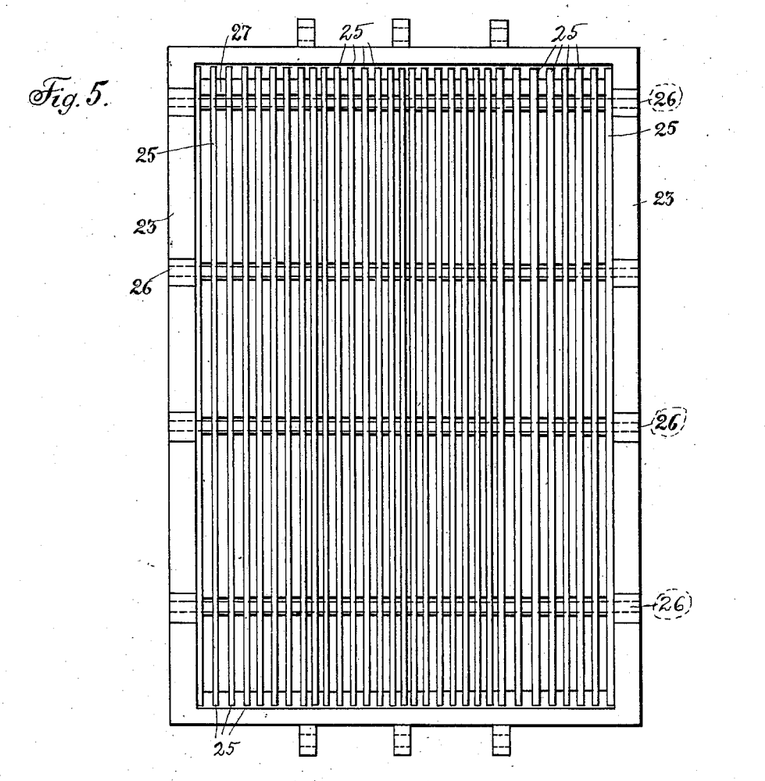
Fig. 5 a plan of the grid forming a part of the breaking device.
Figure 6:
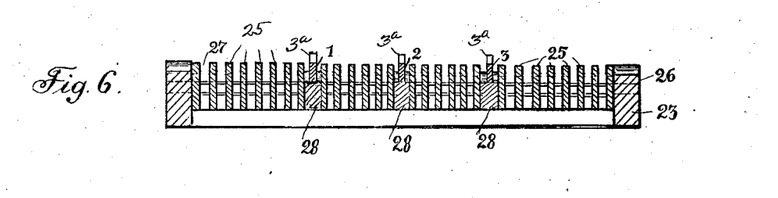
Fig. 6 a vertical cross-section thereof.
Figure 7:
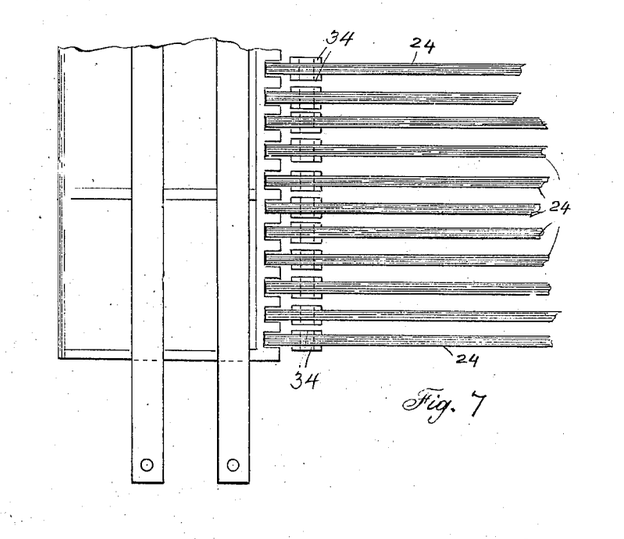
Fig. 7 is a plan showing a number of the blades coöperating with the grid for breaking the straw.
Figures 8, 9:
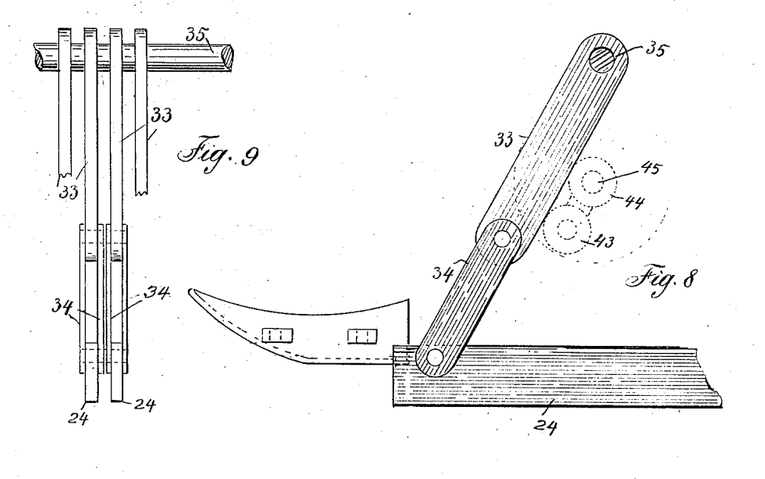
Fig. 8 a side elevation of the means for operating these blades.
Fig. 9 a front elevation of several of the same devices.
Figure 13:
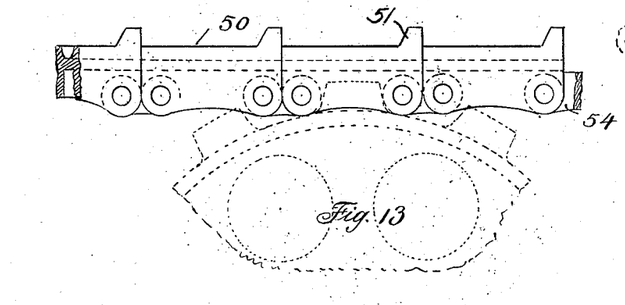
Fig. 13 an elevation of the conveying chain for carrying the broken flax through the beaters.
Figure 14:
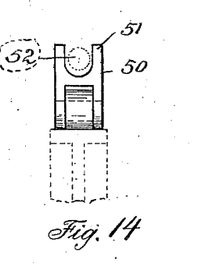
Fig. 14 an end elevation of the chain.
Figure 15:
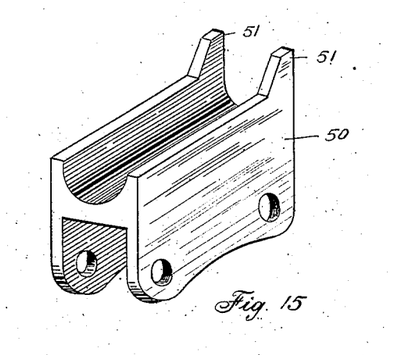
Fig. 15 a perspective view of a link.

The breaking apparatus, which is indicated in Figs. 1 and 2 at C consists in general of a grid, along which the conveyer chains 1, 2 and 3 travel, and a group of blades arranged lengthwise and adapted to enter the recesses or interstices of the grid, together with mechanism for depressing the blades successively into the recesses of the grid and for raising them therefrom. As the straw is fed over the grid by the conveyer chains, the blades crush it down into the recesses, crimp the straw, thereby crackling and crushing the pith and wood. This grid is seen in Figs. 1 and 5 at 23, while the blades which coöperate with it are seen at 24. These parts are seen more clearly in Fig. 3 in vertical cross-section, and in Figs. 5 to 9 inclusive in detail. As shown in Figs. 5 and 6, the grid consists of a frame 23 containing longitudinal bars 25, of rectangular cross-section. These bars are loosely mounted in the frame, being held therein by bolts 26 passing through them. Three of the bars are omitted, to make place for three rails 28, on which the chains 1, 2 and 3 travel over the grid. The links of the chain are of the same width as one of the grid bars and this top part or surface comes flush with the top surface of the series of bars comprising the grid, with the exception of the fingers 3ª for engaging the fiber or straw and carrying it along. The result of this construction and arrangement of chains is to enable the chains to serve both as conveyers and grid bars, as hereinafter more particularly explained. The grid, as a whole, is rigidly supported in the frame of the machine by brackets seen at 29 and 30 in Fig. 1. The blades 24 are of suitable thickness to enter loosely the recesses between the bars 25 of the grid. Each is pivoted at one end on a spindle 31 (Fig. 1) secured by journals to the frame; and each is acted upon by a spring 32 (Figs. 1 and 3), tending to raise it. Each of the bars is connected near its free end with one end of a toggle link comprising the two members 33, 34, of which the upper member 33 is pivoted upon a spindle 35 secured in the frame of the machine, as clearly shown in Figs. 3, 8 and 9. These toggle links are shown broken away in the plan (Fig. 2) to show more clearly other parts of the mechanism. The toggle links 33, 34 are acted upon by two cams, the function of one of which being to straighten the links successively, beginning at the middle of the group and proceeding therefrom in both directions, thereby thrusting the blades down into the recesses of the grid, and the function of the other cam being to knuckle the straightened links at the proper moment, thereby permitting the retractile springs to withdraw the blades simultaneously clear of the grid. The movements of the parts are so arranged, as will be described later, that the depression of the blades begins just after the forward movement of the conveyer belt ceases, while the action of the cam, which raises all the blades, immediately precedes the next forward movement of the chain. Each link-depressing cam consists of an arm or bar 36, carrying a roller 37 at its extremity. All the arms 36 are secured upon a shaft 38 suitably journaled in the frame and driven by a chain 39 and sprocket wheels 40 and 41, so as to rotate in a clockwise direction. The sprocket wheel 41 is fixed to the driving shaft 42, to which power is applied in suitable manner. With reference to the middle arm of the group of arms 36, those to the right and to the left are spaced through equal angles about the shaft to cover about 180°, Figs. 1 and 2. As the shaft 38 rotates the center arm of the group of arms 36 is first to strike a link 33, and thus to depress the middle blade in the grid. The other arms to right and to left of the center arm follow in quick succession, depressing the other blades to the right and to the left of the center one into their respective grooves or recesses. This operation is completed in half a revolution of the shaft 38. The arms then pass off from the toggle links 33, leaving all the links straightened and, for the reason that the three pivots of the two links are then in line, the links maintain the positions of the blades, notwithstanding the retractile efforts of the springs 32. The other cam acting upon these links is a long roller 43, whose ends are pivoted in cranks 44, carried on a shaft 45, journaled in the frame and driven by sprocket wheel 47, chain 48 and sprocket 49 fixed to shaft 38. The cranks 44 are so fixed upon the shaft that the roller 43 is brought into engagement with the undersides of links 33 immediately after the arms 36 are clear of the links; in its further rotation the roller knuckles the links, which being no longer on dead centers permit the springs 32 to simultaneously retract the blades with which they are respectively connected. It will be understood that during this breaking operation the conveyer chains or belts 1, 2 and 3 are in their period of rest but are timed to advance after the depressible blades 24 are released from the grid. It will be understood that the breaking of the straw upon the breaking surface or grid is accomplished by repeated and successive blows beginning at the middle portion and progressing outwardly in both directions. By reason of the construction and arrangement herein shown, each portion receives at the same points a large number of blows or impacts from the blades as the straw passes horizontally over the grid, inasmuch as the complete cycle of movement of the blades and cams is repeated many times before the straw has passed beyond their range of action on the grid, so that the straw is properly and effectually broken and treated for the particular purpose. After passing the breaking apparatus the broken straw is delivered to another conveyer chain, before referred to, indicated at 13 in the drawing. This chain passes around the sprocket wheel 12 on the same shaft 11 with wheels 8, 9, 10 (see Fig. 3) and extends therefrom to the right hand end of the machine, where, as before mentioned, it passes around wheel 14, by which it is driven. This conveying chain, with its coöperating parts, has a function in addition to drawing the straw along, inasmuch as it grasps and holds it first at one side of the middle of its length and later at the other side of the middle of its length, while the beaters operate upon it. The construction of the chain is shown in detail in Figs. 13, 14 and 15, while the related parts, constituting with it the means for holding the straw, are shown in Figs. 16 and 17. Each link 50 (Fig. 15) is provided with upwardly extending prongs 51, adapted to embrace a round rod 52, which is rigidly fixed to the frame of the machine by means of supports 53. The parts 50 of the chain are united, as usual, by links 54. The chain passes over a rail 55 (Fig. 16), which is yieldingly supported in a bracket 56 secured to the frame, and which is strongly pressed upward by spring 57. As will be seen in Fig. 1, this track or rail 55 extends from close proximity to the wheel 12 to the right hand end of the machine near the wheel 14 and is supported at intervals by brackets 56. The rod 52 is not continuous, however, but is interrupted at the point 52ª (Fig. 2) where its end is bent upward, as shown at 58 (Fig. 16). Beyond the gap a similar rod 59 is arranged, which ends at the sprocket wheel 14. These parts thus constitute a mechanism capable of grasping, holding and conveying from the middle to the end of the machine the materials delivered to the chain at its left hand extremity.

At that point each link upon leaving the sprocket wheel in the plane of the bed of the machine comes into an engagement with the curved extremity 58 of the rod 52 and rides along with pressure against it, or against the intervening material until it reaches the gap 52ª, at which point the material is released; but it is carried loosely along by the prongs 51 of the chain into engagement with the second similar rod 59 and thus to the end of the machine. At F, as indicated in plan, (Fig. 2) near the gap in the retaining rod is placed a device for imparting a limited longitudinal motion to the straw. This consists in the present instance, of a pulley 60 and a belt 61, passing around it and around idlers 62 in horizontal planes to a driving pulley 63 upon the shaft 15. The pulley 60 is mounted on the end of a shaft 63, journaled in the frame at an angle whereby the upper reach of the belt 61 is caused to travel in the same general direction with it, but laterally away from the conveyer chain 13. This travel is intermittent, corresponding with the travel of the chain, and is somewhat more rapid than that of the chain. At the point where the fiber is picked up by the belt 61 a belt 61ª is provided on the opposite side of the chain, running on an idler 61ᵇ and over a pulley 61ᶜ fixed to the shaft 15. The plane of the upper reach of this belt is slightly above the plane of the chain, so that the pulley 61ª raises the fiber clear from the teeth of the chain which might become entangled with it during its longitudinal movement; subsequently the belt 61ª assists in conveying the fiber forward. At D and E are located beaters 64, 65. As clearly shown in Fig. 4, the beater D consists of a hub 66, whereon are mounted radial curved arms or blades 67, which sweep alongside of the chain 13 in close proximity thereto. An apron or scutching board is placed on each side of the chain to prevent the material from being swept by the beaters out of reach of the arms. The face of the hub is covered by a plate 68′ flush with the arms. The hub 64 is carried upon a shaft 69, journaled in the frame and driven by pulley 70, belt 71 and countershaft 72, which is itself driven by belt 73 from the main shaft 42. The other beater E is similarly constructed, and is driven by a belt 74 from a pulley on the same countershaft 72.

The scutching board which is provided for each beater or scutching wheel coöperates therewith for the purpose of holding the material, that is the straw or its hank in position to be struck by the arms of the beater, that is the board keeps such material within the path of rotation of the arms. As above stated, each scutching board is placed on each side of its chain, that is above and below the same, the board being made in two parts or sections forming a horizontal slot between them at the level of the chain for the passage of the straw past the beaters. This scutching board is so constructed as to extend across the face of the beater or scutching wheel and its dimensions therefore equal or exceed the diameter of the wheel. This scutching board thus forms two beating zones, one located below the plane of the chain or the axis of rotation of the beater, and the other located thereabove, with an intermediate or neutral zone located at such axis of the beater or scutching wheel, it being understood that the straw or hank is scutched both from above and from below while the neutral zone permits the hank to change its position so as to be acted upon in the opposite direction from that of the first scutching action of the beater or wheel.

The shaft 22, which drives the reciprocating rod 20 and thus imparts the intermittent motion to the system of conveying chains and belts, is driven by sprocket chain 75 from shaft 45, which is itself driven from shaft 38, driven in turn from the main shaft 42.

In the operation of the machine the straw, of approximately uniform length, is laid crosswise on the chains 1, 2 and 3 in a thin and fairly uniform bed. As the chains are moved along step by step the straw is carried to and upon the grid, it being borne in mind, that the forward motion of the conveyer chains takes place when the blades are elevated. Immediately after the straw is thus brought into place the blades are thrown down upon it, in the manner hereinbefore described, the middle one first and the others to right and left in quick succession thereafter. Each blade as it strikes the straw crushes and presses the latter into the recess formed between the two adjacent bars 25 of the grid. The wood and pith of the straw is thus broken, crushed and loosened from the fiber. When each blade strikes the straw the latter is fixed at the point where the preceding blade has engaged it, but is free at the end; hence the blade last striking the straw finds slack for the crimp or bend which it produces in thrusting the straw into the recess of the grid, and does not put a strain upon the fiber itself, tending to break or tear the fiber. In this operation of breaking the straw or fiber, the three conveyer chains act as and are equivalent to three grid bars, inasmuch as the fiber is broken over the chains in the same manner as over the grid bars. The particular conveyers which may be termed the "break conveyers" thus possess a double function, that of conveyer and of grid bars. At each revolution of the shaft 38, every stalk on the bed of the breaking appliance is subjected to a series of breaking and crushing operations proceeding from the middle of the stalk outward to its ends, which leaves the fibers intact and the wood and pith broken and more or less detached from the fiber. The bed of broken straw is conveyed step by step by the chains to the point where it is delivered to the chain 13, near the middle of the machine. At that point the layer of straw is seized and held near the middle of the stalks between the links 50 and the rod 52; and by the moving links is carried up to and past the beater D. The arms of the beater thresh out the loosened pith and wood in the fiber, leaving the latter clean and unbroken. It will be observed that the scutching wheel or beater beats up upon the fiber as the latter approaches the wheel, but subsequently beats down upon it after the fiber has been conveyed across the diameter or neutral zone of the wheel and is about to leave the scutcher. Thus, in one continuous passage of the hank of fiber across the diameter of the scutching wheel, the hank of fiber is beaten upon both sides without the aid of the reversal of the position of the hank which is customary in hand scutching. After passing the beater at D the chain brings the straw near its right hand end to the gap in the upper rod 52. Up to this point the straw has been dragging along on the longitudinal bars of the bed, as shown at 76 (Fig. 4). At this point the stalks drag upon the belt 61, trending away from the conveyer chain, and while the hold of the rod 52 is relaxed, the belt 61 imparts a slight longitudinal motion to the body of the flax, dragging it aside, so that the part which has been crackled but not cleaned is dragged out of engagement with the conveyer chain 13 and the cleaned fiber is brought over the chain. When a sufficient displacement has thus been produced the chain carries the cleaned fiber under the upturned end of the rod 59, whereby the mass of flax is again grasped and securely held while it is conveyed past the second beater E. At this beater, it will be observed, the hitherto uncleaned end of the flax is threshed and cleaned. After passing this beater the fiber, cleaned throughout its length, is delivered by the chain at the end of the machine.

Although any bed or surface suitable for obtaining the proper breaking and crushing of the straw by the described action of the blades is within the scope of my invention, I prefer to employ the grid for such purpose, inasmuch as this particular construction permits the pith or wood which may become detached from the fiber to fall clear through the bed or surface, because the openings or interstices extend all the way through the grid.

I claim:

1. In a machine of the class described, means for breaking the straw by successive impacts along the length thereof comprising a grooved surface; a plurality of blades adapted to coöperate with the grooves thereof and to strike the straw transversely and means for first operating the center blade and then the blades on both sides in succession.

2. In a machine of the class described, means for breaking the straw by successive impacts along the length thereof comprising a grooved surface, a plurality of blades adapted to coöperate with the grooves thereof and to strike the straw transversely, said blades being normally held away from said surface with a yielding pressure, and means for moving the blades successively against said surface to break the straw.

3. In a machine of the class described, the combination with a grid, of a plurality of separately actuated blades adapted to coöperate therewith, means for conveying the straw across and upon the grid, and means for depressing the blades consecutively upon the grid from the center outwardly.

4. In a machine of the class described, the combination of a grid having longitudinal grooves or spaces in its upper surface, a plurality of separately actuated blades adapted to register with said grooves, and means for conveying the straw across and upon the grid, means for moving the blades consecutively to register with and force the straw into said grooves, the center blade being operated first and the other successively from center outwardly.

5. In a machine of the class described, the combination of a grid having longitudinal grooves or spaces in its upper surface, a plurality of separately actuated blades adapted to register with said grooves, means for depressing the blades consecutively into the grooves, beginning with the center blade and progressing outwardly in both directions, and a conveyer adapted to hold the straw transversely to the said blades and grooves and to convey it in a direction parallel with the blades, as described.

6. In a machine of the class described, the combination of a grid having grooves in its upper surface, of a plurality of blades adapted to register with said grooves, means for normally holding the blades clear of the grooves, and means for moving the blades into the grooves.

7. In a machine of the class described, the combination with a grid having grooves in its upper surface, of a plurality of blades adapted to register with said grooves, means for withdrawing the blades clear of the grooves, and means for thrusting the blades into the grooves consecutively in both directions from the middle blade, whereby slack is provided to prevent tearing the fiber, as described.

8. In a machine of the class described, the combination of a grid having grooves in its upper surface, of a plurality of blades adapted to register with said grooves, means for depressing the blades into the grooves in consecutive order from the middle blade outwardly in both directions, conveyer tracks on the grid, and conveyer devices traveling on said track for conveying the straw through the machine.

9. In a machine of the class described, the combination of a grid having grooves in its upper surface, of a plurality of blades adapted to register with said grooves, means for depressing the blades into the grooves and controlling the operation thereof comprising toggles connected with the blades and mechanism for breaking and straightening the toggles.

10. In a machine of the class described, the combination of a grid having grooves in its upper surface, of a plurality of blades adapted to register with said grooves, means for depressing the blades into the grooves and controlling the operation thereof comprising a plurality of separate toggles connected with the blades, and a rotatable universal bar arranged to coöperate with all the toggles and break the knuckles thereof.

11. In a machine of the class described, the combination of a grid having grooves in its upper surface, of a plurality of blades adapted to register with said grooves, means for depressing the blades into the grooves and controlling the operation thereof comprising a plurality of separate toggles connected with the blades, a rotatable universal bar arranged to coöperate with all the toggles and break the knuckles thereof and springs connected with the blades for withdrawing them from the grid when their toggle knuckles are broken.

12. In a machine of the class described, the combination of a grid having grooves in its upper surface, a plurality of blades adapted to register with said grooves, and pivoted at one end above the plane of the grid to permit the feeding of the straw thereover, a plurality of toggles connected with the other end of the blades, and means for intermittently breaking and straightening the toggles.

13. In a machine of the class described, the combination of a grid having grooves in its upper surface, of a plurality of blades adapted to register with said grooves, means for depressing the blades into the grooves in consecutive order from the middle blade outwardly in both directions and controlling the operation thereof comprising toggles connected with the blades, a series of actuating devices adapted to straighten the several toggles in successive order beginning with the center blade and progressing outwardly and thereby depress the blades successively, and means for feeding the straw across the grid.

14. In a machine of the class described, the combination of a grid having grooves in its upper surface, of a plurality of blades adapted to register with said grooves, means for depressing the blades into the grooves beginning with the center blade and progressing outwardly and controlling the operation thereof comprising toggles connected with the blades, a series of rotatable actuating arms on a common axis but spaced at different angles relative thereto so as to operate their toggles at different times and means for feeding the straw across the grid.

15. In a machine of the class described, the combination of a grid having grooves in its upper surface, of a plurality of blades adapted to register with said grooves, means for depressing the blades into the grooves and controlling the operation thereof comprising toggles connected with the blades, and a series of rotatable actuating arms on a common axis but spaced at different angles relative thereto so as to operate their toggles at different times, the middle arm being arranged to operate its toggles first and the arms on both sides being arranged to thereafter operate their toggles in successive order.

16. In a machine of the class described, the combination of a breaking grid, a plurality of blades coöperating therewith to break the straw fed across it, means for normally holding the blades clear of the grid with a yielding pressure, and means for thrusting the blades downwardly toward the grid against such yielding pressure.

17. In a machine of the class described, the combination of a grid having grooves in its upper surface, of a plurality of blades adapted to register with said grooves, means for depressing the blades into the grooves in consecutive order from the middle blade outwardly in both directions, and controlling the operation thereof comprising toggles connected with the blades, and a series of actuating devices adapted to straighten the several toggles in successive order beginning with the center blade and progressing outwardly, and thereby depress the blades successively, and means for feeding the straw across the grid.

18. In a machine of the class described, the combination of a grid having grooves in its upper surface, of a plurality of blades adapted to register with said grooves, means for depressing the blades into the grooves beginning with the center blade progressing outwardly, and controlling the operation thereof comprising toggles connected with the blades, and a series of rotatable actuating arms on a common axis but spaced at different angles relative thereto so as to operate their toggles at different times, and means for feeding the straw across the grid.

19. In a machine of the class described, the combination of a breaking grid, a plurality of blades arranged to coöperate therewith to break the straw and pivoted on an axis located above the plane of the grid, means for normally holding the blades clear of the grid with a yielding pressure, and means for thrusting the blades downwardly toward the grid against said yielding pressure.

20. In a machine of the class described, the combination of a grid having longitudinal grooves or channels, a plurality of blades arranged to coöperate therewith to break the straw, a series of separate springs for normally holding the blades clear of the grid, and means for driving the blades downwardly in consecutive order against the tension of their springs.

21. In a machine of the class described, the combination of a grid having longitudinal grooves or channels, a plurality of blades arranged to coöperate therewith to break the straw, said blades being pivoted above the plane of the grid and adapted to oscillate in parallel vertical planes, a series of separate springs for normally holding the blades clear of the grid, and a series of cams for driving the blades downwardly in consecutive order.

22. In a machine of the class described, the combination with the grid having longitudinal grooves or channels, of a plurality of blades, a series of retractile springs for the blades, and a plurality of cams and connections for operating said blades to drive them into the grooves, beginning with the central blade and progressing outwardly.

23. In a machine of the class described, the combination with the bed, of a plurality of breaking blades, a toggle link connected with each blade adapted when straightened to thrust the blade against the bed, a series of cams adapted to engage said links consecutively to straighten them, and a cam adapted to operate on said links when straightened to knuckle them for releasing the blades.

24. In a machine of the class described, the combination with the breaking bed, of the pivoted breaking blades, the toggle links connected therewith, and the rotating cams, said cams being adapted to engage the middle link first and the links at each side thereof consecutively thereafter to crush the straw from the middle toward both ends.

25. In a machine of the class described, the combination with the breaking bed and the breaking blades, and the cams and connections for operating said blades to depress them against the bed consecutively and in both directions from the center of a conveyer chain adapted to feed the straw across the bed, and intermittent driving mechanism for the chain connections from the source of power of the blade-operating mechanism for operating the driving mechanism during the raised position of the blades, the center blade being operated first and the remainder in successive order in opposite directions.

26. In a machine of the class described, the combination of a horizontal conveyer, beaters adapted to separately beat the two opposite end portions of the straw and arranged one in advance of the other on opposite sides of the middle line of the conveyer, means for gripping the straw toward its central portion while being acted upon by the beaters and wholly releasing the straw during its travel between the beaters, and means for moving the straw transversely of the machine.

27. In a machine of the class described, the combination of a horizontal conveyer consisting of a single chain, beaters adapted to beat the two opposite end portions of the straw and arranged one in advance of the other on opposite sides of the chain, means for gripping the straw toward the central portion while being acted upon by the beaters but wholly releasing the straw during its travel between the beaters, and means for moving the straw transversely of the machine while released.

28. The combination with the grooved conveyer chain, of the longitudinal bars engaging the links of the chain and adapted to engage the fibrous material, said bars being separated at their proximate ends to wholly release such material and to permit free movement thereof, and means operating on the fiber while released and adapted to move it lengthwise.

29. In a machine of the class described, the combination with the breaking bed and the breaking blades, and the cams and connections for operating said blades to depress them against the bed consecutively and in both directions from the center of a conveyer chain adapted to feed the straw across the bed, and intermittent driving mechanism for the chain connections from the source of power of the blade-operating mechanism for operating the driving mechanism with the blades in raised position, the center blade being operated first and the remainder in successive order in opposite directions.

30. The combination of a breaking device for breaking the fiber, a "breaker" conveyer for carrying the fiber through said breaking device, a second or "beater" conveyer, a pair of beaters adapted to beat the fiber and arranged in the same horizontal plane, means for clamping the fiber to said "beater" conveyer, but wholly releasing the same after beating action, and an auxiliary conveyer trending in an oblique direction with respect to the "beater" conveyer, whereby the fiber is moved crosswise to such "beater" conveyer.

31. In a machine of the class described, the combination with a conveying device adapted to engage the straw near its middle and to hold it crosswise with respect to its direction of motion, of two beaters on opposite sides of said conveying device adapted to operate upon opposite ends of the straw consecutively, said beaters being arranged in the same horizontal plane and one in advance of the other, and means for imparting slight longitudinal motion to the straw in its passage between the beaters, said conveying device wholly releasing the straw at the time of said longitudinal action.

32. In combination, the conveyer chain and the grooved bar adapted to grasp the broken straw, the beater adapted to operate upon one end of the straw, a second bar engaging the chain, means for wholly releasing the straw for a period after passing the first beater to enable the straw to move longitudinally freely, an obliquely trending conveyer adapted to engage the straw when released to move it lengthwise, a second bar adapted to engage the straw after its release, and a second beater on the opposite side of said chain, being adapted to clean the other end of the straw as described.

33. In a machine of the class described, the combination of a conveyer chain, bars arranged longitudinally thereof adapted to clamp the fibrous material to said conveyer, said bars being separated at their proximate ends to cause an entire release of said fibrous material at such point to enable the straw to move longitudinally freely, an auxiliary conveyer trending in a direction oblique to said first named conveyer and adapted to engage such fibrous material when the latter reaches said separation or gap between the bars, and two beaters arranged to beat the opposite ends of the fibrous material and arranged at different points in the travel of the fibrous material, one beater being arranged rearwardly and the other forwardly of said obliquely trending conveyer.

34. The combination with a conveying device for conveying the straw through the machine, of means for breaking the straw, and an auxiliary conveyer trending in an oblique direction to said conveying device for moving the straw longitudinally with respect to said conveying device, and means for elevating the straw so as to be substantially free of its conveying device while being so moved longitudinally.

35. The combination with a conveying device for conveying the straw through the machine, of means for breaking the straw, and an auxiliary conveyer trending in an oblique direction to said conveying device for moving the straw longitudinally with respect to said conveying device, and means for elevating the straw so as to be substantially free of its conveying device while being so moved longitudinally comprising a third conveyer arranged at one side of said conveying device and adapted to elevate the straw slightly above said conveying device.

36. In a machine of the class described, the combination of a grid, a plurality of blades adapted to coöperate with said grid to break the straw and pivoted at one end above the plane of the grid to permit the feeding of the straw thereover, and means for operating said blades.

BERTRAND S. SUMMERS.

Witnesses:
E. S. POST,
ED. J. RODGERS.